(12) United States Patent
Steinberg

(10) Patent No.: US 6,981,293 B2
(45) Date of Patent: Jan. 3, 2006

(54) PERSONAL HYGIENE ACCESSORY

(76) Inventor: Rochelle Steinberg, 4113 Fox Pointe, West Bloomfield, MI (US) 48323

( * ) Notice: Subject to any disclaimer, the term of this patent is extended or adjusted under 35 U.S.C. 154(b) by 360 days.

(21) Appl. No.: 10/277,601

(22) Filed: Oct. 22, 2002

(65) Prior Publication Data

US 2004/0074033 A1 Apr. 22, 2004

(51) Int. Cl.
*A47K 7/03* (2006.01)
(52) U.S. Cl. ............... 15/210.1; 15/104.94; 15/144.1; 15/144.3; 15/172; 15/244.1; 15/245.1
(58) Field of Classification Search ............... 15/244.1, 15/245.1, 144.1, 210.1, 145, 144.3, 104.94, 15/144.4, 172, 244.2, 160; D28/7, 63; D4/114, D4/137; D34/40, 50
See application file for complete search history.

(56) References Cited

U.S. PATENT DOCUMENTS

| 3,228,398 | A |   | 1/1966 | Leonard et al. ............. 128/269 |
| 3,332,103 | A |   | 7/1967 | Case .......................... 15/511 |
| 4,299,005 | A | * | 11/1981 | Brown ....................... 15/244.2 |
| 4,852,210 | A | * | 8/1989 | Krajicek ....................... 15/228 |
| 5,012,852 | A | * | 5/1991 | Blackhurst .................. 160/351 |
| 5,044,040 | A |   | 9/1991 | Tetrault ..................... 15/210 R |
| 5,176,754 | A | * | 1/1993 | Hirzel ......................... 118/258 |
| 5,566,418 | A | * | 10/1996 | Steffen et al. ............. 15/244.1 |
| 5,673,455 | A | * | 10/1997 | Per-Lee et al. ............ 15/210.1 |
| 5,862,564 | A |   | 1/1999 | Hamm ....................... 15/210.1 |
| D428,147 | S |   | 7/2000 | Wenger et al. ............. D24/133 |

* cited by examiner

Primary Examiner—John Kim
Assistant Examiner—Abraham Bahta
(74) Attorney, Agent, or Firm—Gifford, Krass, Groh, Sprinkle, Anderson & Citkowski, P.C.

(57) ABSTRACT

A device for providing self-assisting hygienic activity to individuals of limited dexterity, the device including an elongated body constructed of first and second telescoping portions and terminating at a first end in an ergonomically configured handle. A hygienic related accessory is secured to the other end of the elongated body, which includes a repositionable goose neck portion. The accessory capable of being manipulated relative to the elongated body in at least one of axially extending and angularly configurable fashions and the accessory is further capable of being releasably engageable to the associated end of the elongated body and substituted by at least one alternately configured accessory drawn from at least one of a sponge attachment, lotion dispensing attachment, disposable sheet attachment, scrub brush attachment and powder applicator attachment.

4 Claims, 5 Drawing Sheets

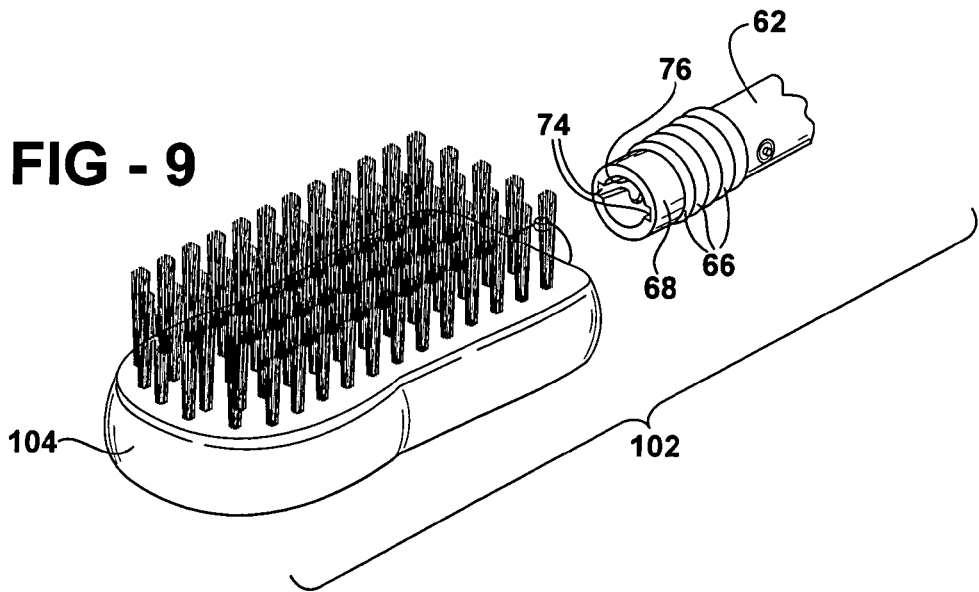
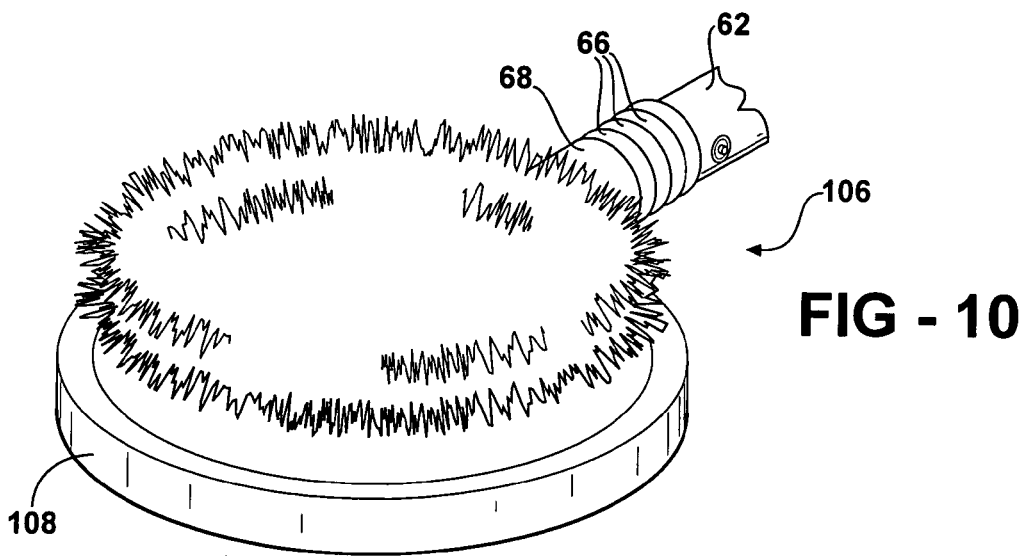

PERSONAL HYGIENE ACCESSORY

BACKGROUND OF THE INVENTION

1. Field of the Invention

The present invention relates generally to hygiene assistance devices. More specifically, the present invention teaches an ergonomically configured, extensible and positionable device capable of supporting a number of different accessories for assisting all persons. This device is particularly helpful to those with limited mobility and dexterity, such as handicapped, obese, elderly and pregnant individuals. For individuals with special needs, this product will enable them to perform their daily hygiene on their own. With this in mind they will be more self-sufficient and able to feel a sense of dignity.

2. Description of the Prior Art

Personal sanitary assistance devices and instruments are fairly well known in the art. The objective in each instance is to assist individuals of limited mobility or dexterity in performing basic self-hygienic practices.

U.S. Pat. No. 5,862,564, issued to Hamm, discloses a first example of a personal sanitary instrument provided to assist individuals in personal hygiene, and further such as in particular useful in assisting overweight or other activity-limited individuals in wiping and cleansing their excretory orifices and surrounding areas. The device includes a laterally extending handle which sections for grasping and manipulation by a user. The handle is connected at one end to a rod, whereas the other end is connected to a finger member which may be fitted with a disposable cover when used. The device is further formed in sections which may be separated for storage.

U.S. Pat. No. 5,044,040, issued to Tetrault, teaches a toileting assist device for use by a patient wearing a back brace or having other body limitations causing inability to reach sufficiently to perform the toileting function. The device includes a base member upon which a removable cleansing fabric is wrapped and an integral handle extending at an obtuse angle from one end of the base member. The length of the handle and the angle thereof relative to the base member are such that the patient, while sitting on a toilet, can reach anatomical areas to be wiped without bending or moving the torso laterally.

U.S. Pat. No. 3,332,103, issued to Case, teaches an adjustable applicator and cleaning tool having a tubular mounting shaft with a hollow flexible sleeve-cover protruding from one end thereof. A flexible applicator sleeve within the applicator sleeve cover is slidably connected to an axis control rod, which is in turn slidably and rotatably mounted within the tubular mounting shaft and so that relative sliding or rotational movement between the axis control rod and the tubular mounting shaft will impart movement to and cause a change of position in the applicator sleeve and the applicator sleeve cover.

U.S. Pat. No. 3,228,398, issued to Leonard et al., teaches a vaginal cleansing instrument including a soft, substantially cylindrical shaped sponge composed of a polyurethane foam and mounted to a curved plastic handled instrument. In particular, the sponge, in order to prevent it from accidentally detaching from the handle, is mounted through the use of surgical tape, following which two layers of a type of glue is applied. Finally, U.S. Design Pat. No. 428,147 illustrates a hand-held personal hygiene instrument illustrating a curved handle portion and an end-mounted attachment portion.

SUMMARY OF THE PRESENT INVENTION

The present invention discloses a personal hygiene accessory provided in the form of an ergonomically configured, extensible and positionable device capable of supporting a number of different accessories for assisting persons of limited mobility and dexterity, such as handicapped, obese, elderly and pregnant individuals. In particular, the present invention is an improvement over previous hygienic assist devices in that it provides both a greater degree of reconfiguration and positioning, combined with the ability to accommodate a wide variety of different hygienic related attachments.

An elongated body is constructed of a durable, and preferably lightweight, material such as which may further include a lightweight material, such as a non-porous rubber or impact resistant plasticized construction. The body further preferably includes at least first and second telescoping portions and terminates at one end in an ergonomically configured handle. A push button may be configured in the body, proximate the handle, for releasing the body for axial extension.

A remote end of the body is suitably configured for supporting, in a further angularly configurable fashion, a hygienic related accessory. In a preferred embodiment, both the body as well as the hygienic accessory is provided with anti-bacterial capability. This includes both pre-application of a coating or powder, as well as instances in which the antibacterial aspect is impregnated or otherwise integrally within the material construction of the body. To this end, a repositionable goose neck portion, such as which may further include a plurality of individual and bendable corrugations, is located proximate the remote extending end and facilitates any desired angular positioning of the accessory.

It is also envisioned that the accessory may, in one variant, be fixed to the remote end of the telescoping/angularly repositionable body. However, and in the preferred application, a plurality of individual accessories are each releasably engageable to the body, such as through the application of tabs and slots defined between an extending neck associated with a given attachment, as well as an open opposing end of the elongated body. In this manner, a number of individual attachments, among them including a sponge attachment, non-porous rubber based lotion dispensing attachment, disposable sheet attachment, scrub brush attachment and powder applicator attachment can be releasably secured to the device.

BRIEF DESCRIPTION OF THE DRAWINGS

Reference will now be made to the attached drawings, when read in combination with the following detailed description, wherein like reference numerals refer to like parts throughout the several views, and in which:

FIG. 9 is an enlarged perspective of a further selected attachment accessory in the form of a scrub brush; and FIG. 10 is a still further enlarged perspective of an attachment accessory in the form of a powder applicator.

DETAILED DESCRIPTION OF THE PREFERRED EMBODIMENTS

Figure 1:
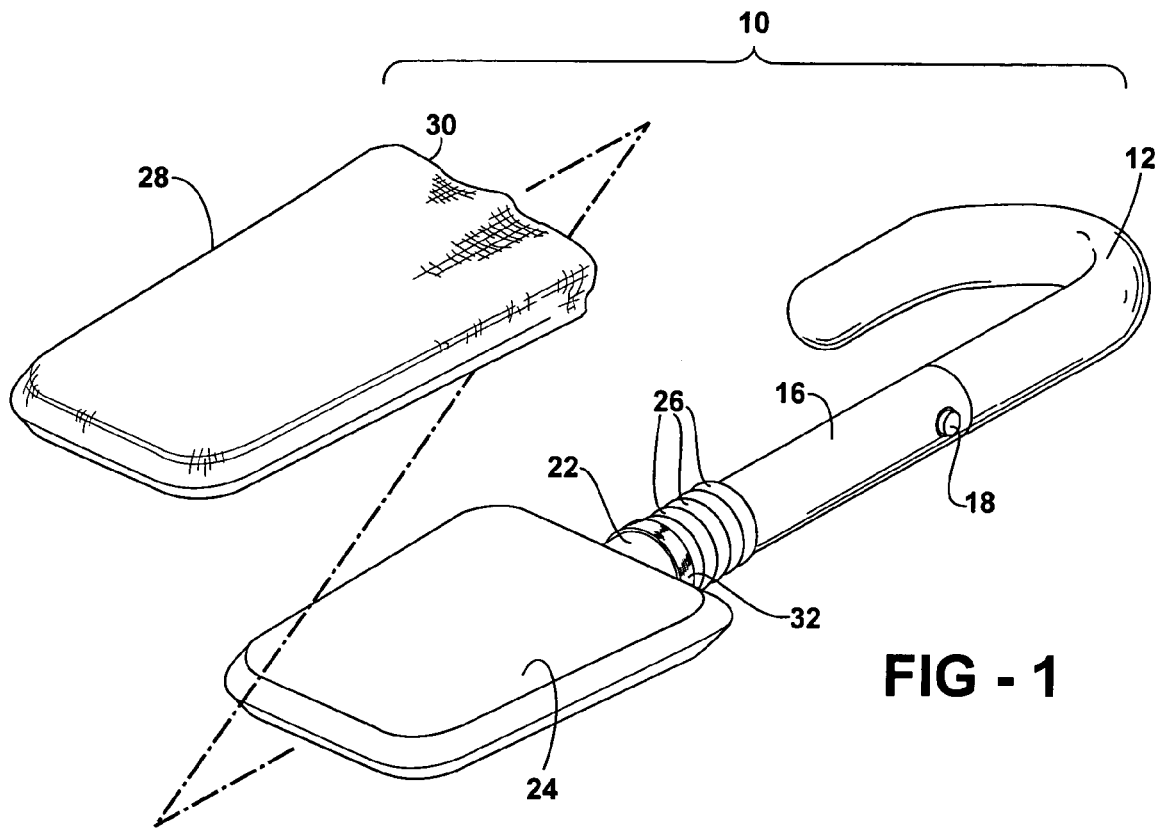
FIG. 1 is a first perspective view, in partially exploded fashion, of the personal assistance device according to the present invention and illustrating a pad accessory attachment according to a first operating variant.
Figure 2:
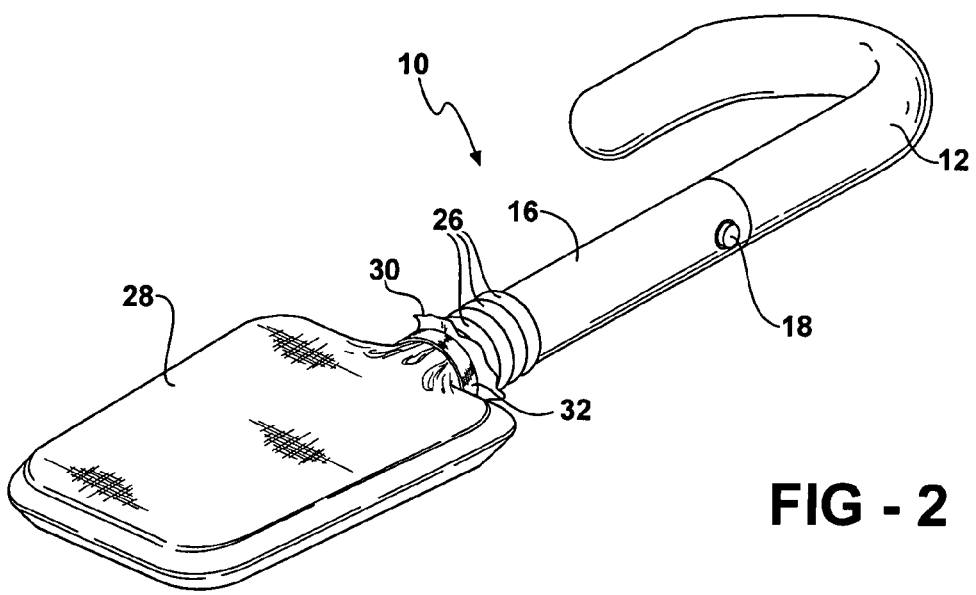
FIG. 2 is a succeeding assembled perspective of the device illustrated in FIG. 1 and further showing the application of an elastic band for holding the pad attachment in place.
Figure 3:
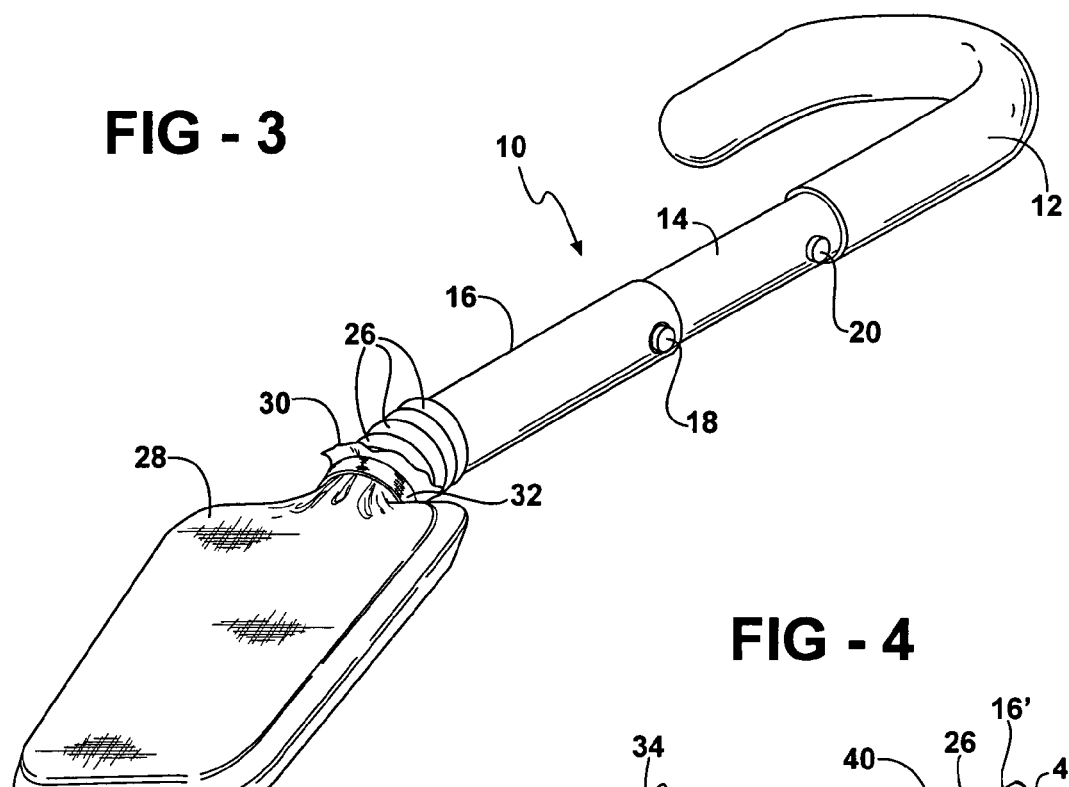
FIG. 3 is a further succeeding perspective of the device shown in FIGS. 1 and 2, and illustrating the combined telescopically extensible and angularly configurable aspects of the hygienic assistance device of the present invention.

Referring now to FIGS. 1–3, a personal assistance device is illustrated at 10 according to a first preferred variant. As indicated previously, the present invention discloses a personal hygiene accessory provided in the form of an ergonomically configured, extensible and positionable device capable of supporting a number of different accessories for assisting persons of limited mobility and dexterity, such as handicapped, obese, elderly and pregnant individuals. As further previously stated, the present invention is an improvement over previous hygienic assist devices in that it provides both a greater degree of reconfiguration and positioning, combined with the ability to accommodate a wide variety of different hygienic related attachments.

Referring again to FIG. 1, the personal assistance device is illustrated in partially exploded fashion and includes an elongated body terminating at a first end in an ergonomically configured handle 12, such as further including a cane shaped, or "U" shaped, handle. Although not shown, it is envisioned that the handle could include any configuration which enhances gripping by the user, and such may further include rubberized finger grips to aid in holding.

As further shown in FIG. 3, the elongated body includes a first telescoping section 14 and a second telescoping section 16. A push button 18, located proximate the handle 12 when the body is in the substantially closed position of FIGS. 1 and 2, is depressed in the illustration of FIG. 3 and in order to telescopically extend the first 14 and second 16 telescoping portions and to axially separate the push button 18 from a seating location 20 defining the closed position.

As discussed previously, the elongated body (and particularly the telescoping portions 14 and 16) may be constructed of a lightweight aluminum or impact resistant plasticized material. The telescoping portions are further illustrated as being tubular in shape, however it is also envisioned that they may include other polygonal (multi-sided) and cross sectional configurations.

Referring again to FIG. 1, a remote end 22 of the elongated body is suitably configured for supporting, in a further angularly configurable fashion, a hygienic related accessory 24. To this end, a repositionable goose neck portion, such as which may further include a plurality of individual and bendable corrugations 26, is located proximate the remote extending end 22 and facilitates any desired angular positioning of the accessory 24.

It is also envisioned that the accessory may, in one variant, be fixed to the remote end of the telescoping/angularly repositionable body and as is illustrated throughout the embodiment 10 of FIGS. 1–3. In the first illustrated variant, the accessory 24 is again provided as a substantially planar and three dimensional body, upon which is capable of being installed such as a disposable and sanitary cover 28 which may be constructed of a sponge or cloth-like (or combined) material. Although not clearly evident, it is known that a disposable sanitary and clear plastic cover (such being hypo-allergenic and anti-bacterial) may be employed over the accessory body 24 and sandwiched between it and the cover 28. Also, and in instances where a rubberized material is utilized in the cover 28, the need for a disposable sanitary cover would be dispensed with.

An open neck of the cover 28 is illustrated at 30 and defines a substantially sleeve shape which fits over the accessory body 24. Referring now FIG. 2, a succeeding assembled perspective of the device illustrated in FIG. 1 further shows the application of an elastic band 32 for holding the pad attachment (or cover 28) in place. The band 32 is applied over the open end 30 of the cover upon it being applied over the accessory body 24 and to maintain it in place. It is also clearly envisioned from the variant of FIGS. 1–3, that the cover 28 is capable of being quickly removed and replaced after use and FIG. 3 again illustrates a further succeeding perspective of the device shown in FIGS. 1 and 2, and combining the telescopically extensible and angularly configurable aspects of the hygienic assistance device according to the first preferred embodiment.

Figure 4:
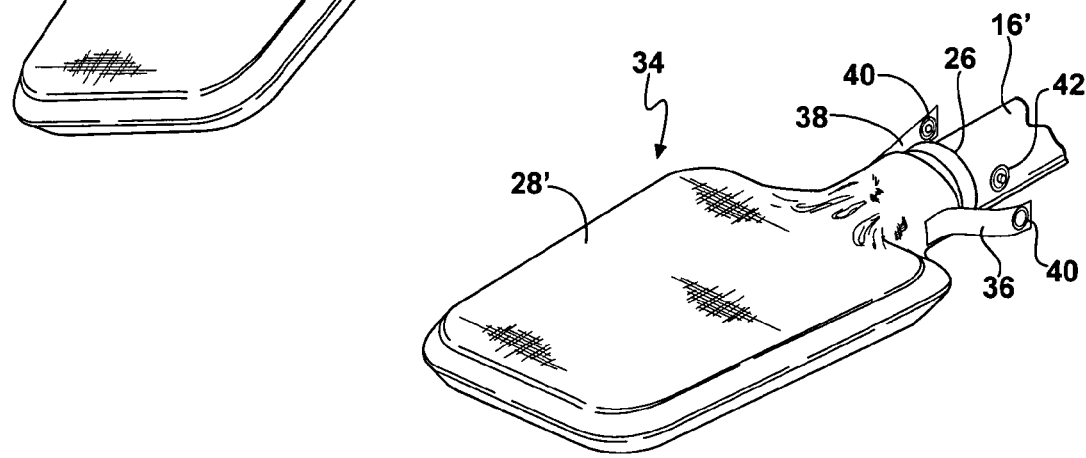
FIG. 4 is a sectional perspective of an alternate attachment variant of the device and which substitutes the elastic band for snap fasteners.

Referring now to FIG. 4, a sectional perspective of an alternate attachment variant of the device is illustrated at 34 and by which an alternate variant of the cover 28' is secured to the accessory body 24 through the substitution of snap fasteners for the elastic band previously identified in FIGS. 1–3 at 32. In particular, straps 36 and 38 extend from locations proximate an open neck of the cover 28' (in this case an elastically tightened open end and such as is shown in FIG. 4). The straps 36 and 38 exhibit snap portions 40 which in turn engage opposing snap portions (see at 42) extending from the associated end of the elongated body.

Figure 5:
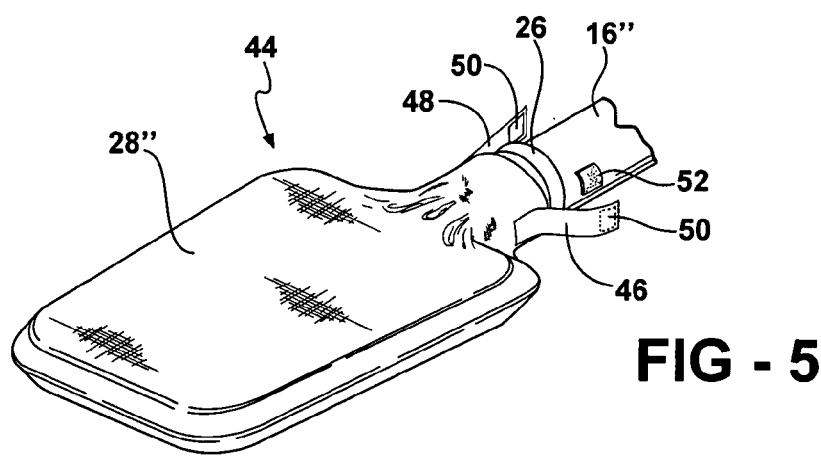
FIG. 5 is a sectional perspective, similar to FIG. 4, and illustrating a further alternate attachment variant in the form of releasable and resecurable fasteners.

Referring further to FIG. 5, a further sectional perspective 44, similar to that illustrated in FIG. 4, is shown of a further alternate attachment variant. Once again, straps 46 and 48 extend from locations proximate an open neck of the cover 28' (again preferably an elastically tightened open end). The straps 46 and 48 exhibit releasable and resecurable portions 50 which in turn engage opposing and associated engaging releasable and resecurable portions (see at 52) extending from the associated end of the elongated body. Without limitation, other and additional structures may be employed for releasably securing the covering material 28 upon the accessory body 24.

Figure 6:
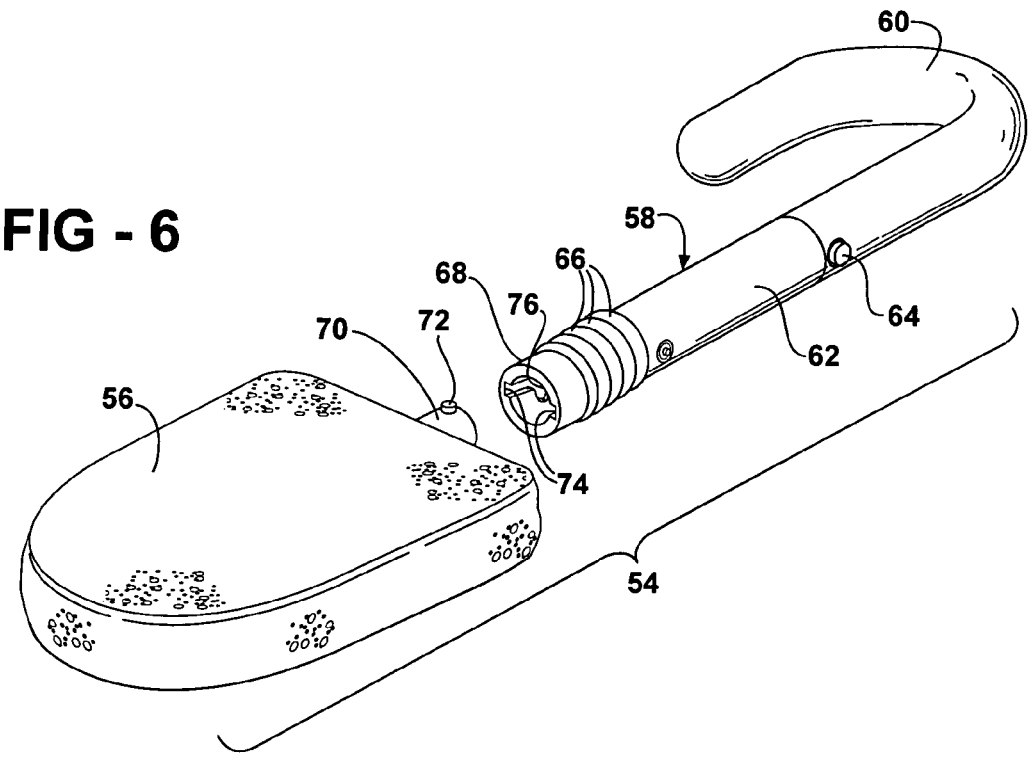
FIG. 6 is an exploded perspective of a personal assistance device according to a yet further variant and which illustrates sponge attachment which is installed in a depress and twist fashion within an open extending end of the elongated handle portion associated with the device.

Referring now to each of FIGS. 6–10, a number of additional and alternating variants according to the present invention are shown in succession, each of which teaches a uniquely configured and releasably engageable accessory for use with the extensible and configurable body. Referring first to FIG. 6, an exploded perspective is illustrated at 54 of a sponge attachment 56 secured to a variation of the elongated body, see generally at 58, according to the present invention.

In particular, the body again includes an ergonomically and arcuately configured end 60, a telescoping body 62 activated by a push button 64, repositionable goose neck portions 66, and an open extending end 68. The sponge attachment 56 includes, at a base surface thereof, an extending neck portion 70 from which a pair of tabs 72 extend laterally outwardly therefrom and seat within associated slots 74 defined within the open opposing end 68 of the elongated body. A twist lock location, see at 76, is provide at an interior recessed and communicating position to each of the recessing slots 74 and in order to secure the attachment 56 in place in a combined depress and twist fashion.

Figure 7:
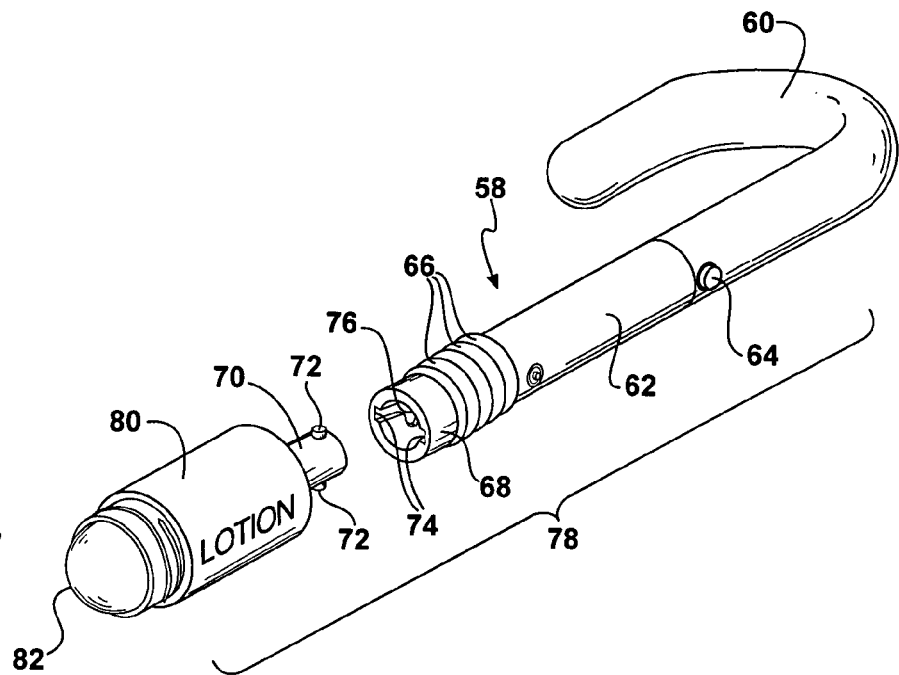
FIG. 7 is an exploded perspective of the personal assistance device according to a still further variant and which illustrates a lotion dispensing attachment, again configured for engaging upon the open extending end of the handle portion in a combined depress and twist fashion according to the present invention.

Referring now to FIG. 7, an exploded perspective is illustrated at 78 according to a still further variant. In this application, a lotion dispensing attachment 80 is provided and is, as previously described in reference to FIG. 6, configured for engaging upon the open extending end 68 of the elongated body in a combined depress and twist fashion. The lotion attachment 80 is preferably refillable and includes a roller ball head 82 to assist in application of the lotion.

Figure 8:
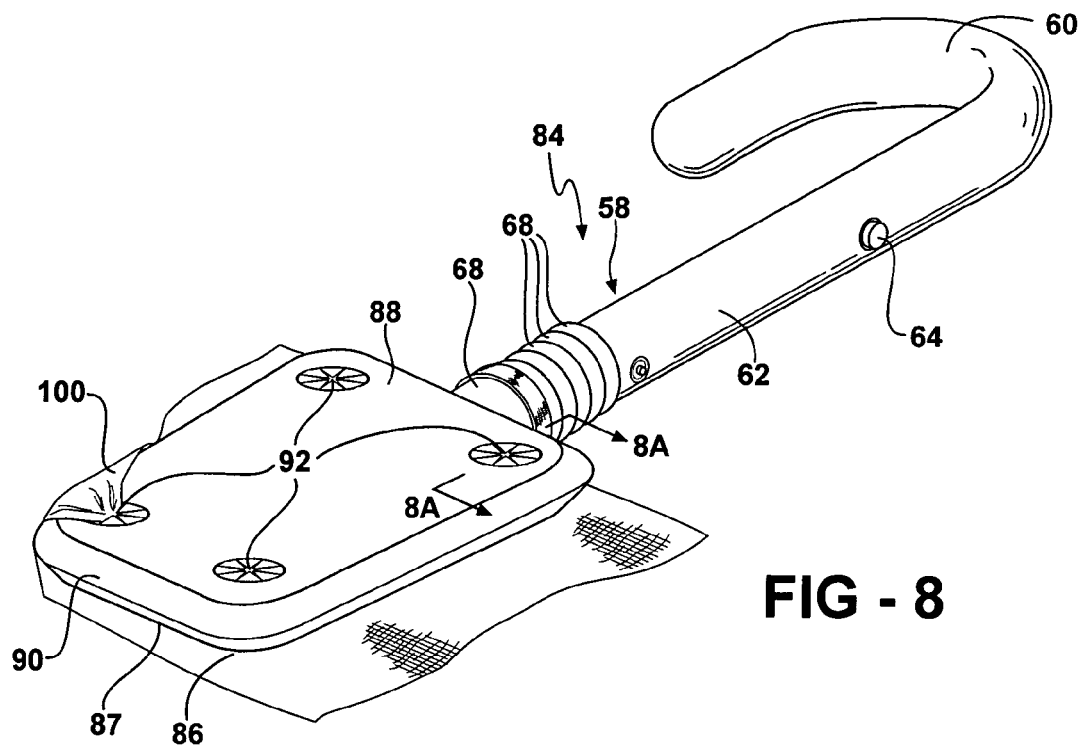
FIG. 8 is an assembled perspective of a personal assist device according to a still further variant and in which a disposable sheet is releasably secured to a selected face of a planar attachment portion through the provision of an edge configured gripping location.
Figure 8A:
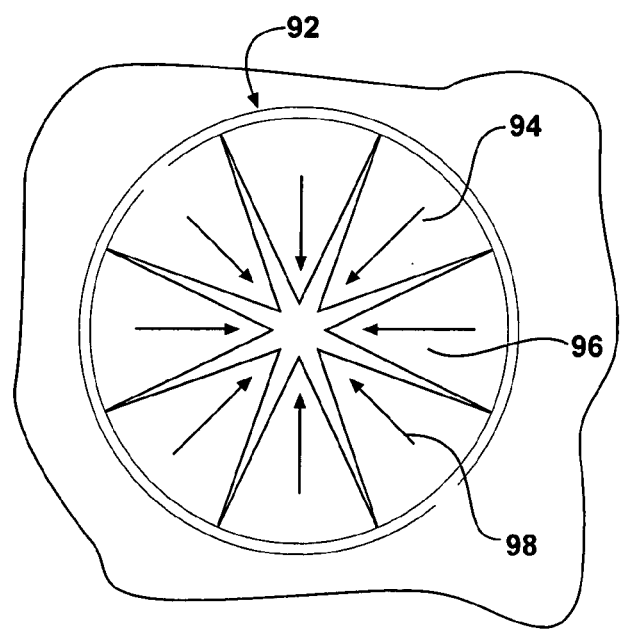
FIG. 8a is an enlarged partial view of a selected gripping location and which illustrates a number of individual and flexible leafs arranged in annularly disposed fashion for gripping a selected corner of the attachable sheet.

FIG. 8 illustrates, at 84, an assembled perspective of a personal assist device according to a still further variant and in which a disposable sheet 86 is releasably secured to a selected face 88 of a planar attachment portion 90 through the provision of edge configured gripping locations 92. The attachment portion 90 may be secured either fixedly (as previously illustrated in FIGS. 1–3) or releasably (as illustrated again at 58 in this variant) to the elongated body and within the scope of the invention. Referring further to FIG. 8a, an enlarged partial view is shown of a selected gripping location 92 and which illustrates a number of individual and flexible leafs, such as at 94, 96, 98, et seq. arranged in annularly disposed fashion and which each illustrates an arrow designating the collapsible and depressible manner of the associated leaf. Upon depressing each of the corners of the attachable sheet 86, such as is shown at 100 in FIG. 8, the sheet 86 is secured in place over a further selected and opposite face 87 of the accessory 90.

Referring to FIG. 9, an enlarged perspective is illustrated at 102 of a further selected attachment accessory in the form of a scrub brush 104 (which could also be motorized as well as manually operable) and, referring finally to FIG. 10, a yet further enlarged perspective 106 of an attachment accessory in the form of a powder applicator 108. Without limitation, other and additional types of accessory attachments may be employed within the scope of the invention.

Having described my invention, it is clear that it teaches a hygienic assistance device designed to allow the handicapped, obese, pregnant, elderly and the like to perform certain self-hygienic related activities. Additional embodiments will become apparent to those skilled in the art to which it pertains and without deviating from the scope of the appended claims.

I claim:

1. A device for providing self-assisting hygienic activity to individuals of limited dexterity, said device comprising:
    an elongated body terminating at a first end in an ergonomically configured handle, the other end of said elongated body terminating in a hygienic related accessory, said accessory further comprising a substantially planar shaped and three-dimensional configuration;
    a hygienic related covering layer applied over at least one facing side of said accessory, said covering further comprising a sheet releasably secured to a selected face of a planar attachment portion, at least one configured gripping location positioned on said attachment and to which said sheet is secured;
    a plurality of gripping locations located at respective corners of said selected face, each of said gripping locations further comprising a number of individual and flexible leafs arranged in annularly disposed fashion for gripping a selected portion of the attachable sheet;
    said accessory capable of being manipulated relative to said elongated body in at least one of an axially extending fashion and an angularly configurable fashion; and
    said angular reconfiguration of said accessory further comprising a repositionable goose neck portion located on said elongated body proximate said accessory, said goose neck portion further comprising a plurality of individual and bendable corrugations.

2. The device as described in claim 1, said elongated body further comprising at least first and second telescoping portions.

3. The device as described in claim 2, further comprising a push button portion extensible through said handle, depressing said button causing said elongated body to axially extend from a first telescoping position to a second telescoping position.

4. The device as described in claim 1, wherein the elongated body is constructed of a lightweight plastic.

* * * * *